United States Patent [19]

Lee et al.

[11] 4,347,327

[45] Aug. 31, 1982

[54] RECOVERY OF LITHIUM FROM BRINES

[75] Inventors: John M. Lee; William C. Bauman, both of Lake Jackson, Tex.

[73] Assignee: The Dow Chemical Company, Midland, Mich.

[21] Appl. No.: 95,692

[22] Filed: Nov. 19, 1979

Related U.S. Application Data

[62] Division of Ser. No. 939,545, Sep. 5, 1978, Pat. No. 4,221,767, which is a division of Ser. No. 812,534, Jul. 5, 1977, Pat. No. 4,116,856.

[51] Int. Cl.$^3$ .............................................. C08D 5/20
[52] U.S. Cl. ...................................... 521/28; 252/184; 423/179.5; 423/181
[58] Field of Search ........... 252/184, 426, 428, 429 R, 252/429 A, 430; 423/181, 179.5; 521/28, 61, 63, 32

[56] References Cited

U.S. PATENT DOCUMENTS

| | | | |
|---|---|---|---|
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |
| 4,150,205 | 4/1979 | Wheaton | 521/28 |

*Primary Examiner*—Joseph L. Schofer
*Assistant Examiner*—J. L. Barr
*Attorney, Agent, or Firm*—W. J. Lee

[57] ABSTRACT

An anion exchange resin, containing Al(OH)$_3$ suspended therein, is reacted with aq. LiOH to form microcrystalline LiOH.2Al(OH)$_3$ which is then reacted with a halogen acid or halide salt to form microcrystalline LiX.2Al(OH)$_3$. The resin, after having a portion of the LiX eluted by using an aqueous wash, is used to recover Li$^+$ values from aqueous brines.

9 Claims, No Drawings

RECOVERY OF LITHIUM FROM BRINES

CROSS-REFERENCES TO RELATED APPLICATIONS

This is a divisional application of Ser. No. 939,545 filed Sept. 5, 1978 now U.S. Pat. No. 4,221,767, which application is a divisional application of Ser. No. 812,534 filed July 5, 1977, now U.S. Pat. No. 4,116,856.

In our related application Ser. No. 812,534 filed July 5, 1977, now U.S. Pat No. 4,116,858, there is taught and claimed a particulate, anion exchange resin having suspended therein a microcrystalline form of $LiX.2Al(OH)_3$ where X is a halogen. The present invention provides an improvement over that invention by the use of LiOH to form microcrystalline $LiOH.2Al(OH)_3$ suspended in the resin which is then converted to the desired $LiX.2Al(OH)_3$.

BACKGROUND OF THE INVENTION

As disclosed in the co-filed application referred to above, which application is incorporated herein by reference, the most relevant prior art is believed to be the formation of lithium aluminates or halolithium aluminates for recovery of $Li^+$ from aqueous solutions and the use of cation exchange resins for removing $Li^+$ from aqueous solutions.

In the said co-filed application one method contemplated for preparing the anion exchange resin containing the microcrystalline $LiX.2Al(OH)_3$ is to impregnate the resin with $AlCl_3$, then use ammonia to change the $AlCl_3$ to $Al(OH)_3$, then add a lithium halide to form a lithium aluminate, and then heat to form the microcrystalline $LiX.2Al(OH)_3$, where X is a halogen, dispersed or suspended within the resin. The resin thus prepared is relatively long-lived and may be employed numerous times in a two-stage cyclic process where $Li^+$ values are recovered from brine in one step and the $Li^+$ values are eluted from the resin in another step by using an aqueous wash, preferably a weak solution of lithium halide. Even though the two-steps may be repeated, sequentially, numerous times, the resin capacity is likely to decrease eventually or accidentally to the point at which regeneration or rejuvenation is desirable.

The present invention improves on the preparation, properties, and the performance of the resin/$LiX.2Al(OH)_3$ composition referred to above by employing aq. lithium hydroxide to form a microcrystalline $LiOH.2Al(OH)_3$ structure which is then reacted with a halogen acid or halide salt to obtain the $LiX.2Al(OH)_3$. Throughout this disclosure, the symbol X is used to denote a halide, with chloride being the preferred halide. The term "microcrystalline" is used to indicate small crystals (formed in the small pores, voids, and spaces in the resin) which are detectable by X-ray diffraction, if not by a microscope.

SUMMARY OF THE INVENTION

It has been found, surprisingly and unexpectedly, that the microcrystalline $LiX.2Al(OH)_3$ formed in an anion exchange resin by the present method which first forms $LiOH.2Al(OH)_3$ and then uses a halogen acid or halide salt to form the $LiX.2Al(OH)_3$, substantially improves the cyclable life of the resin/$LiX.2Al(OH)_3$ when used in recovering $Li^+$ values from brine. We have also found, in "reviving" resins which contain inactive degradation products of $LiX.2Al(OH)_3$, that aq. LiOH treatment is effective whereas treatment with lithium halide is not effective though the aq. LiOH treatment is followed by treatment with a halogen acid or halide salt. Alternately, for the aqueous LiOH treatment step, an aqueous solution containing both LiOH and lithium halide may be employed in which case, the need for subsequent treatment with a halogen acid or halide salt is obviated.

In accordance with the present process an improved composite comprising particulate anion exchange resin containing microcrystalline $LiX.2Al(OH)_3$ dispersed therein prepared by providing a particulate anion exchange resin having a hydrous alumina (e.g., amorphous $Al(OH)_3$, Norstrandite, Bayerite, Gibbsite, or mixtures of these) dispersed therein, reacting it with aqueous LiOH to form microcrystalline $LiOH.2Al(OH)_3$ dispersed in the resin, and adding a halogen acid or halide salt to convert the $LiOH.2Al(OH)_3$ to microcrystalline $LiX.2Al(OH)_3$. The aqueous LiOH employed, containing $Li^+$ and $OH^-$ ions, may contain other ions so long as they do not form substantial amounts of precipitates under the conditions employed; such extraneous precipitates can interfere with the efficacy of the exchange resin in selectively removing $Li^+$ from brines.

The resin so-prepared is useful in recovering $Li^+$ values from brine, even brine which contains $Mg^{++}$ values, and may be employed numerous times in such $Li^+$ value recovery in a two-state cyclic process which includes $Li^+$ elution as one stage of the cycle.

DETAILED DESCRIPTION OF THE INVENTION

As disclosed in the above-identified co-filed application, the anion exchange resin may be any particulate, water-insoluble, water-swellable, polymeric structure which contains pendant amine or quaternary ammonium groups, preferably those which are "macroporous" as that term is normally used in the art of ion exchange resins. Of particular interest are the particulate macroporous polymers of styrene cross-linked with divinylbenzene and having pendant amine or quaternary ammonium groups attached thereto. Anion exchange resins known in the art as "weak-base" or "strong-base" are operable; the halide salt forms of the anion exchange resins may also be employed.

The hydrous alumina dispersed in the resin may be formed, e.g., by impregnating the resin with aq. $AlCl_3$ and treating with aqueous $NH_3$ to convert the $AlCl_3$ to $Al(OH)_3$ or may be crystalline forms of hydrated alumina, such as Norstrandite, Bayerite, Gibbsite, or mixtures of these. Hydrated alumina may be formed when microcrystalline $LiX.2Al(OH)_3$ dispersed in the resin is used many times in a cyclic process for removing $Li^+$ from brines; the lithium exchange capacity is likely to slowly degenerate as Norstrandite and/or Bayerite is formed as the degradation product. In either case, treatment at ambient or elevated temperature with aq. LiOH, along with or followed by treatment with a halogen acid or halide salt, will rejuvenate the resin by re-forming microcrystalline $LiX.2Al(OH)_3$ dispersed therein.

When a depleted weak-base resin, containing the degradation product of $LiX.2Al(OH)_3$, is used it should be treated with $NH_4OH$ to convert the weak-base groups to the $OH^-$ form. A strong-base resin may not require treatment with $NH_4OH$, but such treatment is not deleterious and, in some cases, may be beneficial.

The treatment with NH4OH is done prior to treatment with the aq. LiOH.

The amount of aqueous NH3 employed to convert AlCl3 in the resin to Al(OH)3 is generally an excess over the stoichiometric amount needed according to the equation $$3NH_4OH + AlCl_3 \rightarrow Al(OH)_3 + 3NH_4Cl$$

plus an amount needed to neutralize Cl⁻ groups which may be still attached to amine or ammonium groups on the polymer.

The excess NH3 and the NH4Cl is washed out with water prior to treatment with aq. LiOH.

The resin, containing Al(OH)3 precipitated therein, or containing Norstrandite and/or Bayerite or other forms of Al(OH)3, is flooded with enough aq. LiOH to replace substantially all the air and/or liquid which may be present in the resin and to provide enough LiOH in the resin to be an amount which is from about 100% to 110% of the amount required stoichiometrically by the formula LiOH.2Al(OH)3. More than 10% excess may cause solubilization of the alumina hydrate, whereas less than the stoichiometric amount may leave some Al(OH)3 unchanged. Even with 10% excess, there probably is some Al(OH)3 which is not reached by the LiOH and therefore remains uncomplexed. Reaction of the LiOH with the Al(OH)3 to form LiOH.2Al(OH)3 in the resin may be done at ambient room temperature, but this may require extended periods of time of about 24 to 48 hours or more, especially if the Al(OH)3 is crystalline. Increasing the temperature speeds the reaction and at reflux temperature amorphous Al(OH)3 requires only a few minutes whereas crystalline Al(OH)3 requires about ½ to 1 hour or more. Thus, it is preferable, especially in the case of crystalline Al(OH)3, to use increased temperature for the reaction with LiOH so as to have the reaction completed within about ¼ to about 16 hours.

The present invention is found, by analysis and X-ray diffraction study, to yield a more crystalline form of LiX.2Al(OH)3 in the resin than when the same compound is formed directly from hydrated alumina by treatment with lithium halide as in the co-filed application identified supra.

The steps of the process of preparing microcrystalline LiX.2Al(OH)3 dispersed in an anion exchange resin may be generalized as follows:

1. Provide an anion exchange resin in neutral or basic form having dispersed therein an alumina hydrate.
2. React the alumina hydrate with aqueous LiOH at elevated temperature to form microcrystalline LiOH.2Al(OH)3.
3. Treat the microcrystalline LiOH.2Al(OH)3 with a halogen acid or halide salt to form microcrystalline LiX.2Al(OH)3, where X is a halide.

The steps of removing Li⁺ values from Li⁺-containing aqueous solutions, e.g., brines, may be generalized as follows:

1. Provide an anion exchange resin having dispersed therein microcrystalline LiX.2Al(OH)3.
2. If the LiX.2Al(OH)3 is "loaded" with Li⁺-values, reduce the amount of such Li⁺ values by using an aqueous wash, preferably an aqueous wash containing a small amount of Li⁺ values to assure that there remains enough Li⁺ in the resin to preserve the microcrystalline structure of the aluminate. If the LiX.2Al(OH)3 has been previously washed to remove at least an appreciable portion of the Li⁺, then the resin is not already loaded and may be used as is for the next step.
3. Contact with Li⁺-containing aqueous solution or brine with the resin/LiX.2Al(OH)3, thereby loading the resin with Li⁺ and reducing the Li⁺ content of the solution or brine.
4. Elute Li⁺ values from the resin by employing an aqueous wash, preferably a wash containing a small amount of Li⁺ values. A wash containing about 50 to about 200 mg per liter of Li⁺ is especially suitable.
5. Repeat, steps 3 and 4 a plurality of times, each time using a new batch of Li⁺-containing aqueous solution or brine and a new batch of aqueous wash. These "new batches" may, or course, include as a portion thereof, a re-cycled portion of a previous "batch".

A strong base resin, such as Dowex MSA-1, is neutral in its chloride form and may be used in its neutral form or converted to its basic form.

A weak-base resin, such as Dowex MWA-1, should not be used in its chloride form but should be converted to its base form for use in the present invention. Ammonia should be used for converting the resin from its chloride form to its base form. Alkali metal hydroxides, e.g., NaOH, may form alkali metal aluminates with the Al compound in the resin which could be easily water-leached from the resin.

The pH at which the resin/LiX.2Al(OH)3 composition is used for recovering Li⁺ values from brine is generally kept within the range of about 5.5 to 8.0, preferably about 6 to about 7.

The temperature at which the resin/LiX.2Al(OH)3 composition is used in recovering Li⁺ values from brines may be elevated, preferably above about 40° C., most preferably above 50° C. The elevated temperature enhances the process. Many of the natural Li⁺-containing brines are removed from the ground at elevated temperatures and may be used without cooling. Temperatures high enough to cause breakdown or degradation of the polymeric resin should be avoided. Most of the anion exchange resin commercially available would be expected to withstand brine reflux temperatures quite well and most would even withstand operation at superatmospheric pressures if temperatures slightly above normal reflux temperatures are desired.

The following examples are for illustration of the present invention, not to establish the metes and bounds; the invention is limited only by the attached claims.

EXAMPLE 1

For this example, a particulate, macroporous anion exchange resin comprising a styrene-divinylbenzene crosslinked polymer having pendant tertiary amine groups, sold under the tradename DOWEX MWA-1-OH, is used.

The resin is treated according to the cofiled application referred to supra, by flooding it with aqueous saturated AlCl3, then substantially drying it, then using aq. NH3, to convert the AlCl3 to Al(OH)3, then reacting it with lithium chloride at elevated temperature to form crystalline LiX.2Al(OH)3 dispersed in the resin.

The so-prepared resin is subjected to more than 50 cycles of alternate flows of elution water wash and Li⁺-containing brine (Smackover brine) to remove Li⁺ values from the brine. During this time the capacity of the resin is considerably reduced and it is found, by X-ray diffraction, that the aluminum compound dispersed in the resin has been principally converted to an Al(OH)3 form known as Bayerite and probably a small amount of Norstrandite. This form of Al(OH)$_3$ is ineffective and inactive for forming the desired microcrystalline LiX.2Al(OH)$_3$ and attempts to reactivate it with LiCl at elevated temperatures are unsuccessful.

It is found, however, that the resin (containing the inactive Bayerite and Norstrandite) is reactivated by treating it with conc. NH$_4$OH to neutralize any acidity then, after draining off excess NH$_4$OH, is treated with aq. LiOH at elevated temperature. After the LiOH treatment, analysis by X-ray diffraction indicates a well-crystallized pattern, LiOH.2Al(OH)$_3$, but no Bayerite or Norstrandite. Subsequent treatment with a halogen acid or halide salt, e.g., LiCl, converts the crystalline LiOH.2Al(OH)$_3$ to crystalline LiX.2Al(OH)$_3$.

The resin is found to undergo no significant decrease of capacity after 140 cycles of alternating flows of Smackover brine and elution using a wash water containing about 60 ppm Li$^+$.

We claim:

1. A particulate anion exchange resin having suspended therein a microcrystalline LiOH.2Al(OH)$_3$ structure.

2. The composition of claim 1 wherein the resin is a macroporous resin.

3. The composition of claim 2 wherein the macroporous resin is at least one of the group comprising water-insoluble, water-swellable anion exchange resin particles of polystyrene crosslinked with divinylbenzene and having affixed thereto amine or quaternary ammonium groups.

4. A particulate anion exchange resin having suspended therein amorphous or crystalline hydrous alumina.

5. The composition of claim 4 wherein the hydrous alumina is amorphous.

6. The composition of claim 4 wherein the hydrous alumina is crystalline.

7. The composition of claim 4 when prepared in accordance with the process which comprises
   incorporating an aluminum salt into the resin, and
   converting said aluminum salt to hydrous alumina by contacting it with aqueous NH$_3$.

8. The composition of claim 4 when prepared in accordance with the process which comprises
   providing the resin with an aluminate compound suspended therein, and
   aqueous leaching the aluminate to substantially remove leachable portions of the aluminate compound, leaving a residue of hydrous alumina in the resin.

9. The composition of claim 4 wherein the anion exchange resin is a macroporous anion exchange resin comprising at least one of the group consisting of water-insoluble, water-swellable particles of polystyrene crosslinked with divinylbenzene and having affixed thereto amine or quaternary ammonium groups.

* * * * *